United States Patent
Ewert

(10) Patent No.: US 11,508,237 B2
(45) Date of Patent: Nov. 22, 2022

(54) METHOD AND SYSTEM FOR ASCERTAINING PARTICULAR PIECES OF STATUS INFORMATION FOR AT LEAST ONE GEOGRAPHICAL POSITION WITH THE AID OF AUTONOMOUS OR SEMI-AUTONOMOUS VEHICLES

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 16/703,333

(22) Filed: Dec. 4, 2019

(65) Prior Publication Data

US 2020/0184808 A1 Jun. 11, 2020

(30) Foreign Application Priority Data

Dec. 6, 2018 (DE) ........................ 102018221179.5

(51) Int. Cl.
*B60W 20/40* (2016.01)
*G08G 1/01* (2006.01)
(Continued)

(52) U.S. Cl.
CPC ......... *G08G 1/0141* (2013.01); *G05D 1/0088* (2013.01); *G06V 20/56* (2022.01);
(Continued)

(58) Field of Classification Search
CPC .. G08G 1/0141; G08G 1/0112; G08G 1/0145; G08G 1/096725; G08G 1/166;
(Continued)

(56) References Cited

U.S. PATENT DOCUMENTS

| 10,074,279 | B1 | 9/2018 | Xu et al. | |
| 2016/0229404 | A1* | 8/2016 | Byun | ....................... H04W 4/21 |
| 2020/0055515 | A1* | 2/2020 | Herman | ................. G06V 10/82 |

FOREIGN PATENT DOCUMENTS

| CN | 106527428 A | 3/2017 |
| CN | 106537480 A | 3/2017 |

(Continued)

*Primary Examiner* — Yuen Wong
(74) *Attorney, Agent, or Firm* — Norton Rose Fulbright US LLP; Gerard Messina

(57) ABSTRACT

A method is described for ascertaining particular pieces of status information for at least one geographical position with the aid of autonomous or semi-autonomous vehicles, at least one autonomous or semi-autonomous vehicle detecting pieces of information from its surroundings during a drive with using at least one surroundings sensor and carrying out a planning of its instantaneous travel trajectory based on the obtained pieces of information, and the vehicle detecting additional pieces of information from its surroundings with using its surroundings sensor during a stop, which are not used for planning its instantaneous travel trajectory. The vehicle conveys the ascertained additional pieces of information, with a geographical position at which the additional pieces of information have been detected, to an external server. The external server uses the data received from the vehicle to ascertain at least one piece of status information for the respective geographical position.

12 Claims, 2 Drawing Sheets

(51) Int. Cl.
  *G08G 1/0967* (2006.01)
  *G05D 1/00* (2006.01)
  *H04W 4/40* (2018.01)
  *G08G 1/16* (2006.01)
  *G06V 20/56* (2022.01)

(52) U.S. Cl.
  CPC ......... *G08G 1/0112* (2013.01); *G08G 1/0145* (2013.01); *G08G 1/096725* (2013.01); *G08G 1/166* (2013.01); *H04W 4/40* (2018.02); *B60W 2554/00* (2020.02); *B60W 2556/50* (2020.02)

(58) Field of Classification Search
  CPC ...... G08G 1/0129; G08G 1/0133; G08G 1/04; G08G 1/048; G08G 1/0137; G08G 1/127; G05D 1/0088; G06V 20/56; H04W 4/40; H04W 4/44; H04W 4/02; H04W 4/38; B60W 2554/00; B60W 2556/50; G08C 17/02; H04L 67/12
  See application file for complete search history.

(56) References Cited

FOREIGN PATENT DOCUMENTS

| CN | 107850672 A | 3/2018 |
| DE | 102013205392 A1 | 10/2014 |
| DE | 102015225094 A1 | 6/2017 |

\* cited by examiner

METHOD AND SYSTEM FOR ASCERTAINING PARTICULAR PIECES OF STATUS INFORMATION FOR AT LEAST ONE GEOGRAPHICAL POSITION WITH THE AID OF AUTONOMOUS OR SEMI-AUTONOMOUS VEHICLES

CROSS REFERENCE

The present application claims the benefit under 35 U.S.C. § 119 of German Patent Application No. DE 102018221179.5 filed on Dec. 6, 2018, which is expressly incorporated herein by reference in its entirety.

FIELD

The present invention relates to a method for ascertaining pieces of status information for at least one geographical position with the aid of autonomous or semi-autonomous vehicles. The present invention also relates to a control unit as well as to a system for carrying out the method.

BACKGROUND INFORMATION

Autonomous vehicles are automated vehicles that are able to carry out a drive without a driver. While a fully autonomous vehicle carries out all driving functions and the driver thus no longer participates in the driving process, a semi-autonomous vehicle independently carries out merely a portion of the driving functions, the driver still continuing to participate in the driving process. The autonomous vehicle in this case drives by independently detecting the course of the road, other traffic users or other obstacles in its surroundings and by calculating a suitable travel trajectory based on the pieces of information obtained in the process. The vehicle subsequently controls the course of the drive in accordance with the calculated travel trajectory by sending appropriate control instructions to the vehicle actuating elements. To detect its surroundings, autonomous vehicles use various surroundings sensors such as, for example, radar, LIDAR, ultrasonic sensors, video camera and satellite-assisted navigation. These surroundings sensors are generally a part of driver assistance systems, which are designed to support the driver in particular driving situations. During the drive, the driver assistance systems intervene semi-autonomously or autonomously in the drive, steering or signaling devices of the vehicle, and warn the driver in critical situations via suitable human-machine interfaces. Due to the multitude of pieces of information that have to be collected and evaluated during the drive with the aid of the system of surroundings sensors, the autonomous vehicle focuses during the identification and evaluation solely on information that is necessary to ensure a safe operation.

SUMMARY

An object of the present invention is to provide an option for detecting pieces of status information of the surroundings of autonomous vehicles. This object may be achieved by an example method according to the present invention. The object may also be achieved by an example control unit according to the present invention, as well as an example system according to present invention. Additional advantageous specific embodiments of the present invention are described herein.

According to the present invention, an example method is provided for ascertaining particular pieces of status information for at least one geographical position with the aid of autonomous or semi-autonomous vehicles. In this method, at least one autonomous or semi-autonomous vehicle detects pieces of information from its surroundings during a drive with the aid of at least one surroundings sensor and subsequently carries out a planning of its instantaneous travel trajectory based on the pieces of information obtained in the process. It is further provided that during a stop caused by an instantaneous traffic situation, a traffic sign or another piece of traffic infrastructure, the at least one vehicle detects particular additional pieces of information from its surroundings with the aid of its at least one surroundings sensor, which are not used for planning its instantaneous travel trajectory. The at least one vehicle conveys the ascertained additional pieces of information, together with a geographical position, in which the additional pieces of information have been detected, in the form of data to an external server. The external server uses the data received from the at least one vehicle in order to ascertain at least one piece of status information for the respective geographical position. Since the surroundings sensors are not used during the stop of the autonomous or semi-autonomous vehicle for planning the travel trajectory, the available sensor capacity and computing capacity of the vehicle may be used for obtaining additional pieces of information from the surroundings of the vehicle. Based on these pieces of additional information, authorities, service providers or other bodies are able to ascertain particular pieces of status information for the respective geographical positions. This includes, for example, urban planning and traffic planning authorities, which are able to check the traffic situation at particular traffic locations at particular times based on the pieces of status information. By also utilizing the surroundings sensors of the autonomous vehicle in a vehicle stop, the autonomous vehicle becomes part of an infrastructure referred to as the "Internet of Things" (IoT). Since the corresponding surroundings sensors in a vehicle stop are not required for the trajectory planning in any case, the additional use of the sensors for the IoT infrastructure is harmless from a safety perspective. Thus, the concept according to the present invention makes a seamless integration of autonomous vehicles within the infrastructure of an intelligent city possible.

In one specific embodiment of the present invention, it is provided that during the stop the at least one vehicle identifies other vehicles, passers-by and/or other objects in its surroundings with the aid of its at least one surroundings sensor, and ascertains as additional pieces of information the type, status, the number, the arrangement and/or movement status of the vehicles, passers-by and other objects identified by it. With the aid of these additional pieces of information, it is possible to monitor the status of the traffic at the respective location. Weak points in the traffic infrastructure may also be identified in this manner and corresponding countermeasures may be initiated.

In another specific embodiment of the present invention, it is provided that during the stop, the at least one vehicle ascertains as an additional piece of information the prevailing weather conditions at its position with the aid of its at least one surroundings sensor. With the aid of these pieces of information, it is possible, for example, to ascertain whether a need for action exists at the respective geographical position with respect to traffic routing or road clearance. Furthermore, the pieces of local weather information from multiple geographical positions may be used for ascertaining regional and nation-wide weather situation reports and for weather forecasting.

In another specific embodiment of the present invention, it is provided that the external server uses the additional pieces of information received from the at least one vehicle in order to determine at least one of the following additional pieces of information for the respective geographical position, namely, the traffic density of vehicles and/or passersby, local and/or regional weather conditions, extent and progress of construction sites, status of roads, buildings and other structures, status of traffic infrastructures, degree of occupancy of existing parking areas, efficiency of up-to-date concepts regarding traffic routing and/or traffic control, need for maintenance operations and cleaning operations of the roads and/or of other traffic infrastructures and/or status of the vegetation and/or progress of garbage removal. With the aid of these pieces of information, it is possible, for example, for public entities such as, for example, urban planning, traffic authority, office of public order, fire department or police to obtain various knowledge about the respective geographical position. An evaluation of such pieces of status information over a defined period of time further allows an understanding of particular developments of the respectively observed objects, structures or patterns. Thus, it is possible overall to observe or monitor particular locations with respect to defined aspects.

In another specific embodiment of the present invention, it is provided that the external server sends a request to the at least one vehicle to transmit particular additional pieces of information from at least one geographical position. The at least one vehicle ascertains the respective additional pieces of information, which may also include raw sensor data, and sends these pieces of information to the external server in response to its request. This makes it possible to specifically obtain pieces of information about particular locations. This approach enables, in particular, a long-term monitoring or long-term observation of particular locations. As a result of the specific request and the subsequent response, the data traffic between the vehicles and the external server are meaningfully reduced.

In another specific embodiment of the present invention, it is provided that the at least one vehicle ascertains its geographical position with the aid of a global positioning system or with the aid of a feature map, and sends it in the form of data to the external server. This enables a particularly accurate evaluation of the received data. Objects present at the respective locations may, in particular, be observed individually over a longer period of time.

In another specific embodiment of the present invention, it is provided that the external server receives corresponding additional pieces of information and associated geographical position from multiple vehicles and uses the additional pieces of information for ascertaining at least one piece of status information for at least one geographical position. In this way, it is possible to monitor or observe larger areas in a spatially and chronologically fine-meshed manner.

In another specific embodiment of the present invention, it is provided that the additional pieces of information are transmitted from the at least one vehicle to the external server with the aid of a car-to-x communication link, of a mobile radio communication link and/or of another wireless communication link. The wireless data transmission enables the external server to observe or monitor the relevant locations virtually in real time.

An example control unit is also provided for an autonomous vehicle for carrying out the method according to the present invention. The control unit in this case is designed to detect pieces of information from the surroundings during a drive with the aid of at least one surroundings sensor, and to carry out a planning of an instantaneous travel trajectory based on the pieces of information obtained in the process. The control unit is further designed to detect during a stop caused by an instantaneous traffic situation, a traffic sign or another piece of traffic infrastructure with the aid of at least one surroundings sensor particular additional pieces of information from the surroundings of the vehicle, which are not used for planning an instantaneous travel trajectory. The control unit is further designed to convey the ascertained additional pieces of information, together with a geographical position in which the additional pieces of information have been detected, in the form of data to the external server.

An example system for carrying out the method is also provided, which includes at least one autonomous vehicle, as well as an external server. The vehicle in this case is designed to detect pieces of information from its surroundings during a drive with the aid of at least one surroundings sensor, and to carry out a planning of an instantaneous travel trajectory based on the pieces of information obtained in the process. The vehicle is further designed to detect during a stop caused by an instantaneous traffic situation, a traffic sign or another piece of traffic infrastructure with the aid of its at least one surroundings sensor, particular additional pieces of information from the surroundings of the vehicle, which are not used for planning its instantaneous travel trajectory. The vehicle is further designed to convey the ascertained additional pieces of information, together with a geographical position, in which the additional pieces of information have been detected, in the form of data to the external server. The external server in this case is designed to ascertain at least one piece of status information for the respective geographical position with the aid of the data received from the at least one vehicle.

In one specific embodiment of the present invention, it is provided that the system includes an artificial intelligence for carrying out the method in the vehicle or on the external server. With the aid of such an artificial intelligence, which may be implemented, for example, with the aid of neural networks, it is possible to also relatively easily ascertain particularly complex correlations for the respective geographical positions from the additional pieces of information conveyed by the vehicles. This is particularly advantageous when a particularly large amount of data from multiple vehicles, from multiple locations and over a longer observation period are to be analyzed.

In accordance with the present invention, an example computer program is provided, including instructions, which, when the program is executed by a computer, prompt the computer to carry out the method. With the aid of such a computer program, it is possible to implement the features of the present invention in a particular, simple, flexible and cost-efficient manner.

The present invention is described in greater detail below with reference to figures.

DETAILED DESCRIPTION OF EXAMPLE EMBODIMENTS

Figure 1:
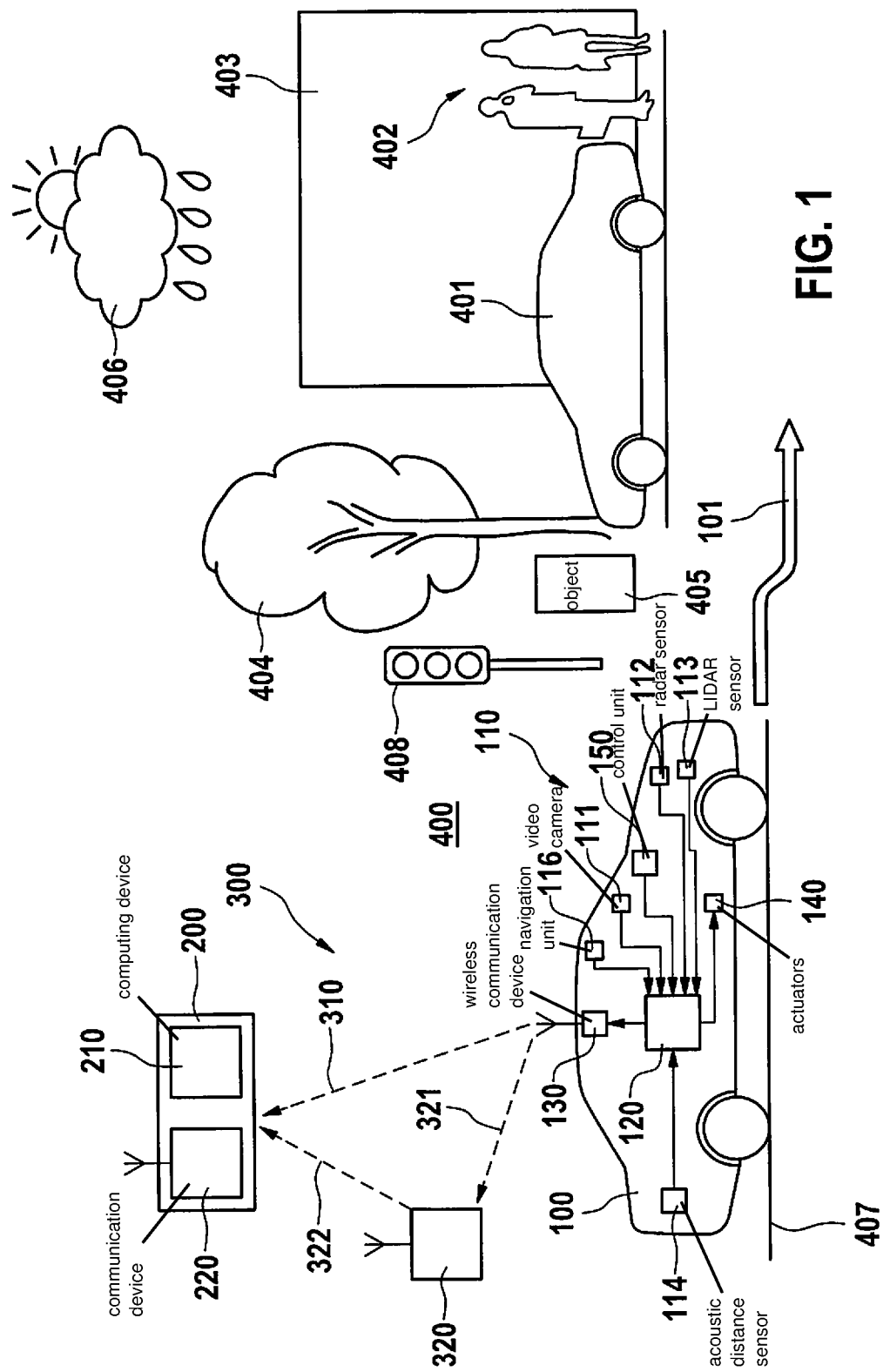
FIG. 1 schematically shows a representation of the system with an autonomous vehicle, which detects its surroundings with the aid of surroundings sensors, and an external server.

The present invention provides utilizing surroundings sensors temporarily not required for the trajectory planning of the vehicle for additional functions during a vehicle stop, for example, at a traffic light, at an intersection or in a traffic jam. Pieces of information from the surroundings of the vehicle, which are not required for the instantaneous trajectory planning, are, in particular, detected during the stop with the aid of the surroundings sensors. In this case, additional pieces of information may also be detected, which are generally not detected during the regular driving operation or are not used for the trajectory planning. The vehicle subsequently conveys the detected additional pieces of information to an external server situated preferably in the cloud, which subsequently ascertains particular pieces of status information of the respective location of the vehicle based on these additional pieces of information. Alternatively, the vehicle conveys raw sensor data to the cloud, the ascertainment of the additional pieces of information then taking place directly in the cloud. In this way, it is possible to utilize autonomous vehicles for monitoring the traffic area and the infrastructure in particular regions or for obtaining additional pieces of information in conjunction with the relevant geographical positions.

According to the present invention, in addition to the trajectory planning, the surroundings sensors of an autonomous vehicle are also utilized for additional purposes. If such a vehicle is at a stop, for example, at an intersection, at a traffic light switched to red or in a traffic jam, then a trajectory planning of the vehicle based on the data of the surroundings sensors is unnecessary during the stop. A trajectory planning in the vehicle need take place only immediately prior to resuming the drive. As long as the vehicle is stopped, the surroundings sensors of the vehicle are not required for the driving operation, and are thus available for additional purposes, for example, for an anonymized identification of passers-by or pedestrians, as well as for ascertaining the number and the movement status of the same for the period of the stop. Furthermore, an anonymized identification of a number of vehicles or a traffic density in a traffic jam situation or at an intersection for the period of the stop may also take place.

In addition, weather conditions at the location of the vehicle for the period of the stop may also be identified with the aid of the surroundings sensors. A camera sensor may, for example, transmit data to the cloud via a car-to-x communication link. These data may be subsequently evaluated within the cloud with respect to weather conditions, for example, with the aid of an artificial intelligence (AI). Thus, the ascertainment of weather conditions at a particular location in a particular urban area is possible at any point in time. On this basis, it is possible to convey specific storm warnings to humans or to vehicles.

Moreover, structures around the vehicle may also be identified, which are irrelevant for the autonomous driving during the stop, but which are of significance for a further evaluation.

The pieces of information additionally detected by the surroundings sensors during the vehicle stop are conveyed, for example, via a car-to-x communication link or mobile radio communication link to authorities or to an urban planning where it is evaluated in an anonymized manner. The autonomous or semi-autonomous vehicles therefore become part of the Internet-of-Things (IoT) infrastructure during the vehicle stop, the vehicles collecting additional data with the aid of the previously installed surroundings sensors for an anonymized evaluation in the cloud.

An anonymized identification of passers-by, as well as their number, their position and their movement status is meaningful, for example, for an urban planning. For example, it may be ascertained in the cloud how many pedestrians wish to cross a particular intersection at a particular point in time (time of day, date). From this, it may be deduced whether an additional pedestrian crosswalk should be taken into consideration in the urban planning.

The anonymized identification of parked vehicles or of a traffic density during a vehicle stop or in a traffic jam situation is equally meaningful for the urban planning. Thus, with the aid of these pieces of information in the cloud, it may be ascertained, for example, how many vehicles are parked at the roadside at a particular point in time or how many vehicles are situated in a traffic jam situation on the highway at a particular time of day. From these additional pieces of information, it may be deduced whether in the relevant city additional parking areas are to be provided or whether a broader highway is to be constructed.

Moreover, it is possible during the vehicle stop to identify structures that are situated around the vehicle. For example, the vehicle ascertains with the aid of a satellite-assisted navigation unit a high-accuracy GNSS (global navigation satellite system)-based vehicle position on a high-accuracy map or, alternatively, a high-accuracy surroundings sensor-based position on a feature map and conveys this position in the form of data to the cloud, for example, with the aid of a car-to-x communication link. The data of particular surroundings sensors at precisely this vehicle position are also transmitted to the cloud in parallel or subsequently thereto. An external server within the cloud subsequently ascertains structures or patterns that are situated around the vehicle. Alternatively, the ascertainment of the structures or patterns may also take place in the vehicle already before the data are transmitted to the cloud. A preferably anonymized evaluation takes place within the cloud with the aid of these structures or patterns, together with the high-accuracy vehicle position. With the aid of these transmitted data, an urban planning or city administration is able to determine, for example, in which urban areas at a particular time of day a garbage removal has taken place or has not yet taken place. In addition, it may be centrally ascertained whether a particular construction site is still present in a particular urban area and what dimensions this construction site currently occupies. The progress of the construction of buildings may also be determined.

In another specific embodiment, the surroundings sensor data or the anonymized objects, structures or patterns around the vehicle already identified in the vehicle are transmitted to the cloud at a vehicle stop directly via the communication between the vehicle and a piece of traffic infrastructure such as, for example, a traffic light. The traffic light and the vehicle in this case are equipped with a car-to-x communication link.

In another specific embodiment, a request is made from the cloud to particular vehicles at a particular position in the world at a vehicle stop to transmit data of particular surroundings sensors via a car-to-x communication link to the cloud. The corresponding vehicles subsequently transmit the requested data for the respectively requested surroundings sensors upon request to the cloud, in which a preferably anonymized evaluation of the data is performed.

In another specific embodiment, the surroundings sensor-based additional pieces of information are ascertained in the vehicle or in the cloud with the aid of an artificial intelligence (AI), which may be designed as a neural network. This AI is preferably able to evaluate the data of different surroundings sensors and of geographical positions in accordance with the required additional purpose with the aim of evaluating the ascertainment of additional pieces of information.

In another specific embodiment, the transmitted data are evaluated from outside the vehicle within the cloud with the aid of an artificial intelligence (AI), which may be designed as a neural network. This AI is preferably able to evaluate the data of different autonomous vehicles or of their surroundings sensors and positions in accordance with the required additional purpose.

A typical driving situation of an autonomous or semi-autonomous vehicle 100 is depicted in FIG. 1 for illustrating the present invention, in which vehicle 100 is moving autonomously on road 407 along a trajectory 101. To ensure a safe drive, vehicle 100 in this case scans particular areas in its immediate surroundings with the aid of its surroundings sensors and in the process detects both the course of road 407 and other traffic users and other obstacles along its route. Various surroundings sensors such as, for example, a front video camera 111, a radar sensor 112, a LIDAR sensor 113, an acoustic distance sensor 114, etc. are used by vehicle 100 for detecting its surroundings 400. Vehicle 100 also detects its exact geographical position preferably with the aid of a satellite-assisted navigation unit 116. By evaluating the sensor data, an internal control unit 120 subsequently calculates the course of travel trajectory 101 of vehicle 100 and sends appropriate control signals to corresponding actuators 140 of vehicle 100 in order to carry out the drive in accordance with calculated travel trajectory 101.

In the present exemplary embodiment, vehicle 100 temporarily comes to a stop due to a traffic light 408 switched to red. Since vehicle 100 carries out no trajectory planning during its stop, its surroundings sensors 111 through 116 are used for the period of the stop for detecting various additional pieces of information from its surroundings 400. These additional pieces of information are subsequently conveyed in the form of data to an external server 200, which ascertains particular pieces of status information for the respective whereabouts of vehicle 100 based on the received data. As additional pieces of information, vehicle 100 detects in its surroundings 400 various objects, structures, patterns and situations, among other things, as well as those that are not necessary for a trajectory planning during regular operation. Thus, for example, pedestrians and passers-by 402 are detected, which takes place preferably in an anonymized manner, and their number, their respective position and/or their respective movement status are ascertained as additional pieces of information. Furthermore, parked vehicles 401 in addition to driving vehicles are detected, which also takes place in a preferably anonymized manner, and their number, their respective model and their respective position and/or their respective movement status are ascertained as additional pieces of information. Based on these additional pieces of information, external server 200 is able to deduce particular pieces of status information for the respective vehicle location such as, for example, the instantaneous traffic density, the instantaneous traffic flow, the instantaneous traffic jam situation, the degree of occupancy of parking areas, particular accident situations and traffic situations, etc. In addition to movable objects, such as passers-by and vehicles, vehicle 100 is also able to detect static objects such as, for example, buildings and other structures 403, as well as construction sites in its surroundings 400, and to convey them as additional pieces of information to external server 200. From this, it is possible to deduce the status, the need for rehabilitation or the construction progress of the respective structures and construction sites, which may sometimes be used for urban planning. In principle, it is possible with the aid of the surroundings sensor system of vehicle 100 to also detect additional objects, structures and patterns and to convey them as additional pieces of information to external server 200. This includes, for example, traffic signs and other traffic infrastructures, status of the roadway and of the pedestrian walkways. On this basis, for example, the respective competent traffic authority is able to identify here whether renovation needs or repair needs exist.

Vehicle 100 may further detect as additional pieces of information whether the garbage containers in a particular street or area have already been emptied. These additional pieces of information may be used, for example, to reduce traffic obstructions typically caused as a result of garbage collection by suitable traffic control. These and other additional functions may also be used for optimizing the driving routes for garbage removal.

Vehicle 100 may also detect the vegetation and planting 404 present in its surroundings 400 and may convey these as additional pieces of information to external server 200. From this, it may be determined whether trees or bushes growing along the roadside protrude into the area reserved for traffic and must therefore be trimmed or removed.

In addition to the above described objects such as, for example, vehicles, pedestrians, buildings, trees, traffic signs, etc., vehicle 100 may also detect other objects in its surroundings 400 with the aid of its sensors. This may include, in principle, any arbitrary object, depending on the application, which is situated in the surroundings of vehicle 100 and which may be detected by the vehicle with the aid of its surroundings sensors. Another such object 405 is schematically depicted in FIG. 1 for purposes of illustration.

As further shown in FIG. 1, the vehicle may also detect the local weather conditions (for example, cloudiness 406, sunshine, rain, snowfall, fog, etc.) and may convey these in the form of data to external server 200.

External server 200 is preferably a computing system, which may include one or multiple computing devices and data processing devices. Only one computing device 210 is shown by way of example in FIG. 1. An artificial intelligence may be implemented on this computing system, for example, with the aid of neural networks. External server 200 may also include a communication device 220, which may be designed for both wireless and wired communication or data transmission. FIG. 1 shows by way of example a wireless communication device 220.

Figure 2:
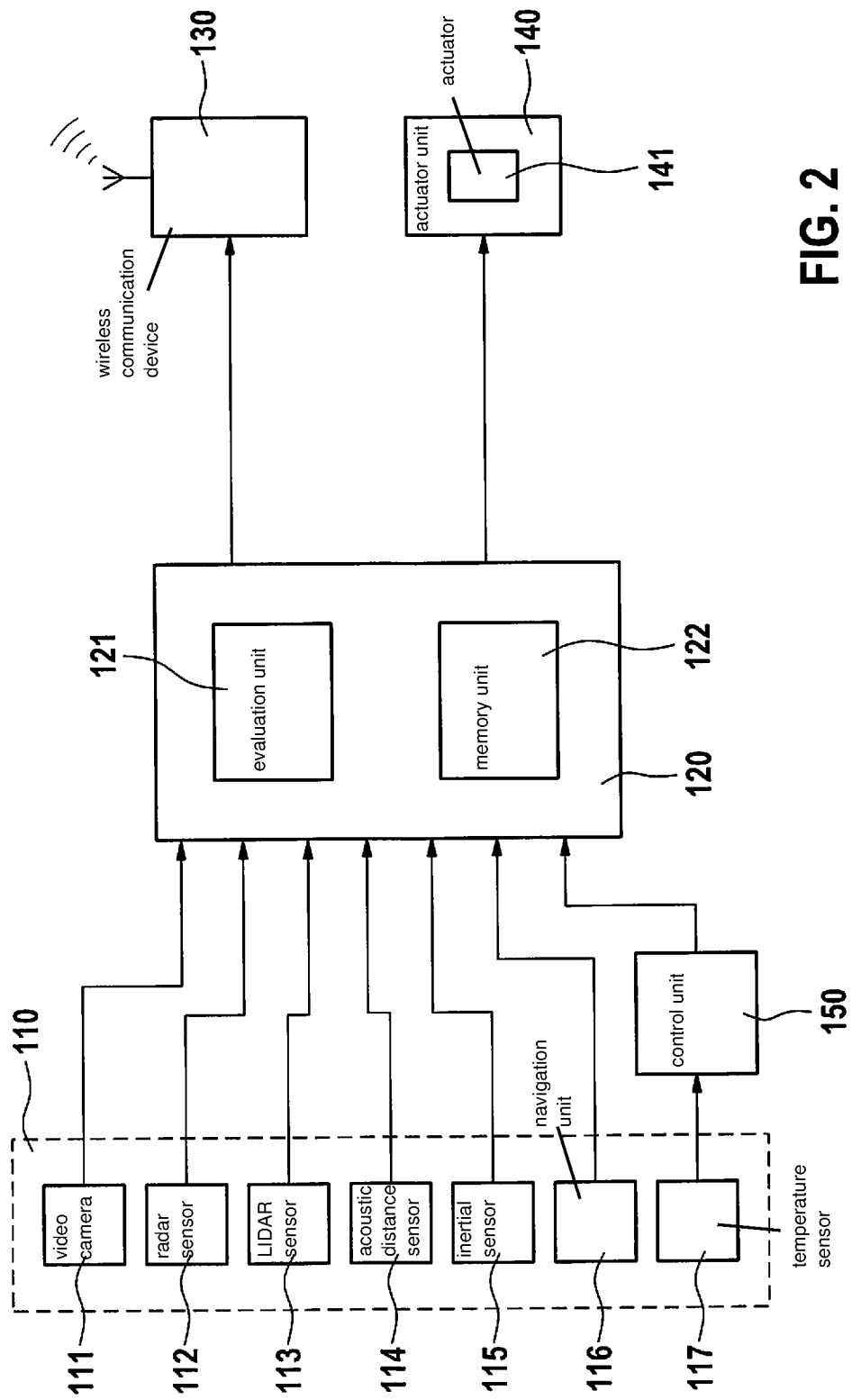
FIG. 2 shows a block diagram of the components of the autonomous vehicle from FIG. 1, including a control unit according to the present invention.

FIG. 2 shows a block diagram of various components of vehicle 100 from FIG. 1, which are used for both autonomous driving as well as for obtaining and conveying additional pieces of information. Vehicle 100 includes a sensor unit 110, a control unit 120, a wireless communication device 130 and an actuator unit 140 that includes at least one actuator 141. Sensor unit 110 in turn includes a number of various surroundings sensors 111 through 116. These include, for example, one or multiple video cameras 111, at least one radar sensor 112, at least one LIDAR sensor 113, at least one acoustic distance sensor 114, at least one inertial sensor 115 for detecting the movement status of vehicle 100, a satellite-assisted navigation unit 116 and at least one temperature sensor 117 for detecting the outside temperature. In addition, sensor unit 110 may also include additional sensors installed in or on vehicle 100, with the aid of which additional pieces of information from surroundings 400 of vehicle 100 are detected (not shown here). Sensors 111 through 117 of sensor unit 110 in this case may be directly connected to control unit 120 via corresponding data lines such as, for example, the vehicle-internal CAN data bus and/or Ethernet data bus. Alternatively, the sensors may also be connected to control unit 120 via a corresponding control unit 150, as in the present exemplary embodiment of temperature sensor 117. During regular driving operation, control unit 120 receives the sensor data of various sensors 111 through 117 of sensor unit 110 and evaluates these sensor data with the aid of an evaluation unit 121. Evaluation unit 121 calculates instantaneous travel trajectory 101 of vehicle 100 based on the sensor data available to it. Control unit 120 subsequently sends corresponding control signals to actuator unit 140, which influences with the aid of at least one actuator 141 the course of the drive of vehicle 100 in accordance with planned trajectory 101. If the drive of vehicle 100 is interrupted due to a particular traffic situation such as, for example, a red traffic light, a lowered barrier, a traffic sign, a traffic jam or another event, control unit 120 or evaluation unit 121 of control unit 120 ascertains the desired additional pieces of information from surroundings 400 of vehicle 100 during the stop of vehicle 100 based on the sensor data received from sensors 111 through 117 of sensor unit 110, and conveys these pieces of information in the form of data wirelessly to external server 200 with the aid of wireless communication unit 130.

Vehicle 100 may, depending on the application, send the obtained additional pieces of information to external server 200 immediately after detection. Alternatively, vehicle 100 may also initially buffer internally the additional pieces of information obtained and may convey the stored pieces of additional information only at certain times, at particular locations and/or only upon request or prompt to external server 200. For this purpose, control unit 120 may include a corresponding memory unit 122.

The additional pieces of information detected by vehicle 100 and conveyed in the form of data to external server 200 may be raw sensor data, as well as partially or fully evaluated or processed sensor data or raw sensor data. In the event that vehicle 100 does not yet convey or only partially conveys evaluated or processed sensor data to external server 200, the evaluation, interpretation and/or processing of these data takes place in computing device 210 of external server 200. Since external server 200 generally includes high-performance computing devices 210, which are also arbitrarily expandable by combining multiple such computing devices, in principle, a greater computing capacity for evaluating, interpreting or processing the raw sensor data or sensor data is available by relocating the information and data processing to external server 200 than is available in the control unit onboard the vehicle. Thus, it is possible to process significantly greater amounts of data on the server side, so that sensor data or raw sensor data and, in principle, more pieces of additional information for the respective geographical positions or areas and associated therewith, also more complex correlations may be ascertained.

Although the present invention has been more particularly illustrated and described in detail with the preferred exemplary embodiments, is not limited by the described examples. Instead, other variations may also be deduced therefrom by those skilled in the art without departing from the scope of the present invention.

What is claimed is:

1. A method for ascertaining particular pieces of status information for at least one geographical position with the aid of autonomous or semi-autonomous vehicles, the method comprising:

detecting, by at least one autonomous or semi-autonomous vehicle, pieces of information from its surroundings during a drive using at least one surroundings sensor;
  carrying out, by the at least one autonomous or semi-autonomous vehicle, a planning of an instantaneous travel trajectory of the at least one autonomous or semi-autonomous vehicle based on the detected pieces of information;
  detecting, by the at least one autonomous or semi-autonomous vehicle, additional pieces of information from the surroundings using the at least one surroundings sensor, during a stop caused by: (1) an instantaneous traffic situation, or (11) a traffic sign, or (iii) another piece of traffic infrastructure, the detected additional pieces of information not being used by the at least one autonomous or semi-autonomous vehicle for planning its instantaneous travel trajectory;
  conveying, by the at least one autonomous or semi-autonomous vehicle, the detected additional pieces of information, together with a respective geographical position at which the detected additional pieces of information have been detected, in a form of data to an external server; and
  using, by the external server, the data received from the at least one autonomous or semi-autonomous vehicle, to ascertain at least one piece of status information for the respective geographical position.

2. The method as recited in claim 1, wherein the at least one autonomous or semi-autonomous vehicle identifies vehicles and/or passers-by and/or other objects and/or weather conditions in its surroundings during the stop using the at least one surroundings sensor, and ascertains as the additional pieces of information, and/or a status, and/or a number, and/or an arrangement and/or a movement status of the autonomous or semi-autonomous vehicles and/or the passers-by and/or the other objects and/or the weather conditions, identified by the at least one autonomous or semi-autonomous vehicle.

3. The method as recited in claim 1, wherein, during the stop, the at least one autonomous or semi-autonomous vehicle ascertains, as the additional piece of information, instantaneous weather conditions at its whereabouts using the at least one surroundings sensor.

4. The method as recited in claim 1, wherein the external server uses the additional pieces of information received from the at least one autonomous or semi-autonomous vehicle to determine at least one of the following pieces of status information for the respective geographical position:
  traffic density of vehicles and/or traffic density of passers-by;
  local weather conditions and/or regional weather conditions;
  extent and progress of construction sites;
  status of roads, buildings, and other structures;
  status of traffic infrastructures;
  degree of occupancy of existing parking areas;
  efficiency of traffic routing and/or traffic control;
  need for maintenance operations of the roads and/or need for cleaning operations of the roads and/or of other traffic infrastructures;
  status of vegetation.

5. The method as recited in claim 1, wherein the external server sends a request relating to particular additional pieces of information to the at least one autonomous or semi-autonomous vehicle to request the at least one autonomous or semi-autonomous vehicle to convey to the server the particular additional pieces of information from at least one geographical position, and the at least one autonomous or semi-autonomous vehicle ascertains the requested particular additional pieces of information and sends the requested particular additional pieces of information to the external server as a response to the request.

6. The method as recited in claim 1, wherein the at least one autonomous or semi-autonomous vehicle ascertains its geographical position using a satellite-assisted navigation unit and/or using a feature map, and sends the ascertained geographical position in a form of data to the external server.

7. The method as recited in claim 1, wherein the external server receives corresponding additional pieces of information and associated geographical positions from multiple vehicles and uses the received corresponding additional pieces of information and the received associated geographical positions for ascertaining at least one piece of status information for at least one geographical position.

8. The method as recited in claim 1, wherein the additional pieces of information are transmitted from the at least one autonomous or semi-autonomous vehicle to the external server using a car-to-x communication link, of a mobile radio communication link and/or of another wireless communication link.

9. A control unit for an autonomous or semi-autonomous vehicle, the control unit, comprising a computer, configured to:
   detect pieces of information from surroundings of the autonomous or semi-autonomous vehicle during a drive using at least one surroundings sensor;
   carry out a planning of an instantaneous travel trajectory of the autonomous or semi-autonomous vehicle based on the detected pieces of information obtained;
   detect additional pieces of information from the surroundings of the autonomous or semi-autonomous vehicle using the at least one surroundings sensor during a stop caused by an instantaneous traffic situation and/or a traffic sign and/or another piece of traffic infrastructure, the detected additional pieces of information not being used for planning the instantaneous travel trajectory of the autonomous or semi-autonomous vehicle; and
   convey the detected additional pieces of information, together with a respective geographical position at which the additional pieces of information have been detected, in in a form of data to an external server.

10. A system for ascertaining particular pieces of status information for at least one geographical position with in an aid of autonomous or semi-autonomous vehicles, comprising:
   at least one autonomous or semi-autonomous vehicle; and
   an external server;
   wherein the at least one autonomous or semi-autonomous vehicle is configured to detect pieces of information from its surroundings during a drive using at least one surroundings sensor, and to carry out a planning of an instantaneous travel trajectory of the vehicle based on the detected pieces of information;
   wherein the at least one autonomous or semi-autonomous vehicle is further configured to detect additional pieces of information from the surroundings of the at least one autonomous or semi-autonomous vehicle using the at least one surroundings sensor during a stop caused by an instantaneous traffic situation and/or a traffic sign and/or another piece of traffic infrastructure, the detected additional pieces of information not being used for planning the instantaneous travel trajectory of the at least one autonomous or semi-autonomous vehicle;
   wherein the at least one autonomous or semi-autonomous vehicle is further configured to convey the detected additional pieces of information, together with a respective geographical position at which the additional pieces of information have been detected, in a form of data to the external server; and the external server is configured to ascertain at least one piece of status information for the respective geographical position with using the data received from the at least one autonomous or semi-autonomous vehicle.

11. The system as recited in claim 10, wherein the vehicle or the external server includes an artificial intelligence.

12. A non-transitory computer-readable medium on which is stored a computer program including instructions for ascertaining particular pieces of status information for at least one geographical position with the aid of autonomous or semi-autonomous vehicles, the computer program, when executed by a computer, causing the computer to perform a method, the method comprising:
   detecting, by at least one autonomous or semi-autonomous vehicle, pieces of information from its surroundings during a drive using at least one surroundings sensor;
   carrying out, by the at least one autonomous or semi-autonomous vehicle, a planning of an instantaneous travel trajectory of the at least one autonomous or semi-autonomous vehicle based on the detected pieces of information;
   detecting, by the at least one autonomous or semi-autonomous vehicle, additional pieces of information from the surroundings using the at least one surroundings sensor, during a stop caused by: (1) an instantaneous traffic situation, or (ii) a traffic sign, or (iii) another piece of traffic infrastructure, the ascertained detected additional pieces of information not being used by the at least one autonomous or semi-autonomous vehicle for planning its instantaneous travel trajectory;
   conveying, by the at least one autonomous or semi-autonomous vehicle, the detected additional pieces of information, together with a respective geographical position at which the detected additional pieces of information have been detected, in the form of data to an external server; and
   using, by the external server, the data received from the at least one autonomous or semi-autonomous vehicle, to ascertain at least one piece of status information for the respective geographical position.

\* \* \* \* \*